[11] 4,388,651
[45] Jun. 14, 1983

Sherman

[54] METHOD AND APPARATUS FOR GENERATING A SCANNED OPTICAL OUTPUT SIGNAL

[75] Inventor: Randy J. Sherman, Phoenix, Ariz.

[73] Assignee: Lincoln Laser Co., Phoenix, Ariz.

[21] Appl. No.: 267,678

[22] Filed: May 28, 1981

[51] Int. Cl.³ .............................................. H04N 3/08
[52] U.S. Cl. .................................... 358/206; 350/6.8
[58] Field of Search ............... 358/63, 206, 208, 285, 358/293; 350/6.7, 6.8

[56] References Cited

U.S. PATENT DOCUMENTS

| | | | |
|---|---|---|---|
| 2,149,198 | 2/1939 | Traub | 358/206 |
| 2,163,548 | 6/1939 | Clothier et al. | 358/206 |
| 3,973,826 | 8/1976 | Lobb | 358/206 |
| 4,030,806 | 6/1977 | Goshima et al. | 350/6.8 |
| 4,230,394 | 10/1980 | Bruggemann et al. | 350/6.8 |

FOREIGN PATENT DOCUMENTS

| | | |
|---|---|---|
| 473910 | 10/1937 | United Kingdom . |
| 487318 | 6/1938 | United Kingdom ................ 358/206 |
| 1419940 | 12/1975 | United Kingdom . |

Primary Examiner—Joseph A. Orsino, Jr.
Attorney, Agent, or Firm—Cahill, Sutton & Thomas

[57] ABSTRACT

A system is disclosed for transforming a collimated beam of light, such as that generated by a laser, into a line scan or a raster image for projecting onto a screen or other object. The laser beam is directed at a rotating mirror having a plurality of facets disposed at equal circumferential intervals around the mirror axis of rotation. The light reflected from the rotating mirror generates a first scanned reflected output beam. A first reflecting surface is aligned to receive the first scanned reflected output beam and generates a second scanned reflected output beam. This second scanned reflected output beam passes through a first pivot vertex and is directed back onto the rotating mirror facets by a second reflecting surface to generate an angularly amplified output beam which scans a first plane. The angularly amplified output beam is directed through a second pivot vertex and is then deflected through a second plane which is oriented perpendicular to the first plane. The angularly amplified output beam which has been deflected through the first and second planes thereby projects a raster image on a screen.

13 Claims, 11 Drawing Figures

METHOD AND APPARATUS FOR GENERATING A SCANNED OPTICAL OUTPUT SIGNAL

BACKGROUND OF THE INVENTION

1. Field of the Invention

This invention relates to optical scanning methods and apparatus, and more particularly, to an optical scanning method and apparatus which develops a scanned output beam from a collimated beam of light.

2. Description of the Prior Art

Optical systems for transforming a collimated beam of light into a raster scan are known in the prior art. However, many of the prior art systems are generally characterized either by considerable complexity or by limited performance. Some comparatively high performance prior art systems utilize a plurality of rotating mirrors which have a large number of facets disposed circumferentially about the axis of rotation. In order to achieve the required high scan rate and scan efficiency, comparatively large diameter polygon mirrors having a multiplicity of facets must be provided and rotated at high rates. Because of bearing strength limitations and the inability to achieve suitable dynamic balance, it has been impractical to fabricate a scanning device utilizing a single polygon mirror which is capable of being rotated at a sufficiently high R.P.M. to produce a television raster scan.

One solution to the problem experienced by prior art devices is disclosed in U.S. Pat. No. 3,782,803 (Buck). This patent discloses a flat mirror scanner including a multi-faceted pyramidal mirror which is rotated in a vertical plane, a multi-faceted polygon mirror which is rotated in a horizontal plane and a pair of spherical mirrors. The pyramidal mirror and the polygon mirror are driven by separate motors at separate rates and must be closely synchronized to generate the desired raster scan image. The pyramidal mirror rotates at a comparatively slow rate and provides vertical deflection while the polygon mirror rotates at a comparatively fast rate and provides horizontal deflection.

SUMMARY OF THE INVENTION

It is therefore a primary object of the present invention to provide an optical scanning method and apparatus for projecting a scanned beam on an object or screen which requires only a single, small diameter rotating polygon mirror which achieves a significantly increased scan efficiency by reflecting an input light beam from the polygon mirror facets two separate times.

Another object of the present invention is to provide an optical scanning method and apparatus for projecting a raster image on a screen which uses a rotating polygon mirror to generate the horizontal deflection for the raster image and an oscillating galvanometer driven planar mirror to generate the vertical deflection for the raster image.

Yet another object of the present invention is to provide an optical scanning method and apparatus for projecting a scanned beam on a screen which includes an optical modulator for varying the intensity of the light beam.

Still another object of the present invention is to provide an optical scanning method and apparatus which is capable of projecting either a monochromatic or color television image on a large screen and which is compact, portable and less expensive than prior art systems.

Briefy stated, and in accord with one embodiment of the invention, an optical scanner receives an input light beam and directs that light beam onto a rotating mirror at a first position to produce a first scanned reflected output beam. A first reflectting surface is aligned to receive the first scanned output beam and generates a second scanned reflected output beam. The second scanned reflected output beam is directed through a first pivot vertex back onto the rotating mirror to generate an angularly amplified output beam which scans a first plane. To generate a two dimensional raster scan for television or other uses, the angularly amplified output beam is deflected through a second plane oriented perpendicular to the first plane and is then projected onto a screen or other object to produce a raster image corresponding to the video input signal. The television image projection version of the present invention includes an optical modulator which modulates the intensity of the input light beam to correspond to the intensity of the video signal component of a composite video signal.

DESCRIPTION OF THE DRAWINGS

The invention is pointed out with particularity in the appended claims. However, other objects and advantages together with the operation of the invention may be better understood by reference to the following detailed description taken in connection with the following illustrations wherein:

DESCRIPTION OF THE PREFERRED EMBODIMENT

In order to better illustrate the advantages of the invention and its contributions to the art, a preferred hardware embodiment of the invention will now be described in detail.

Figure 1:
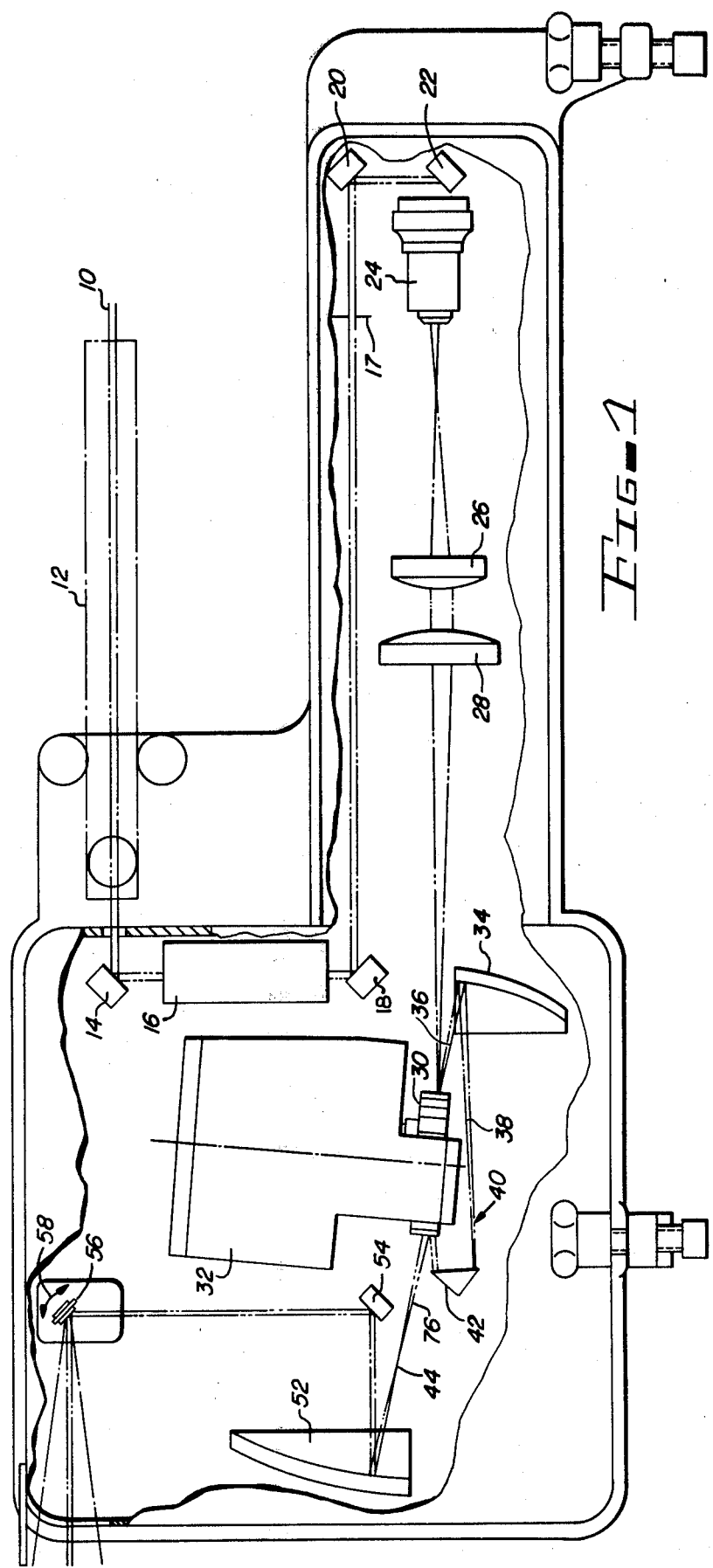
FIG. 1 is an elevational view of the optical scanning apparatus of the present invention.
Figure 2:
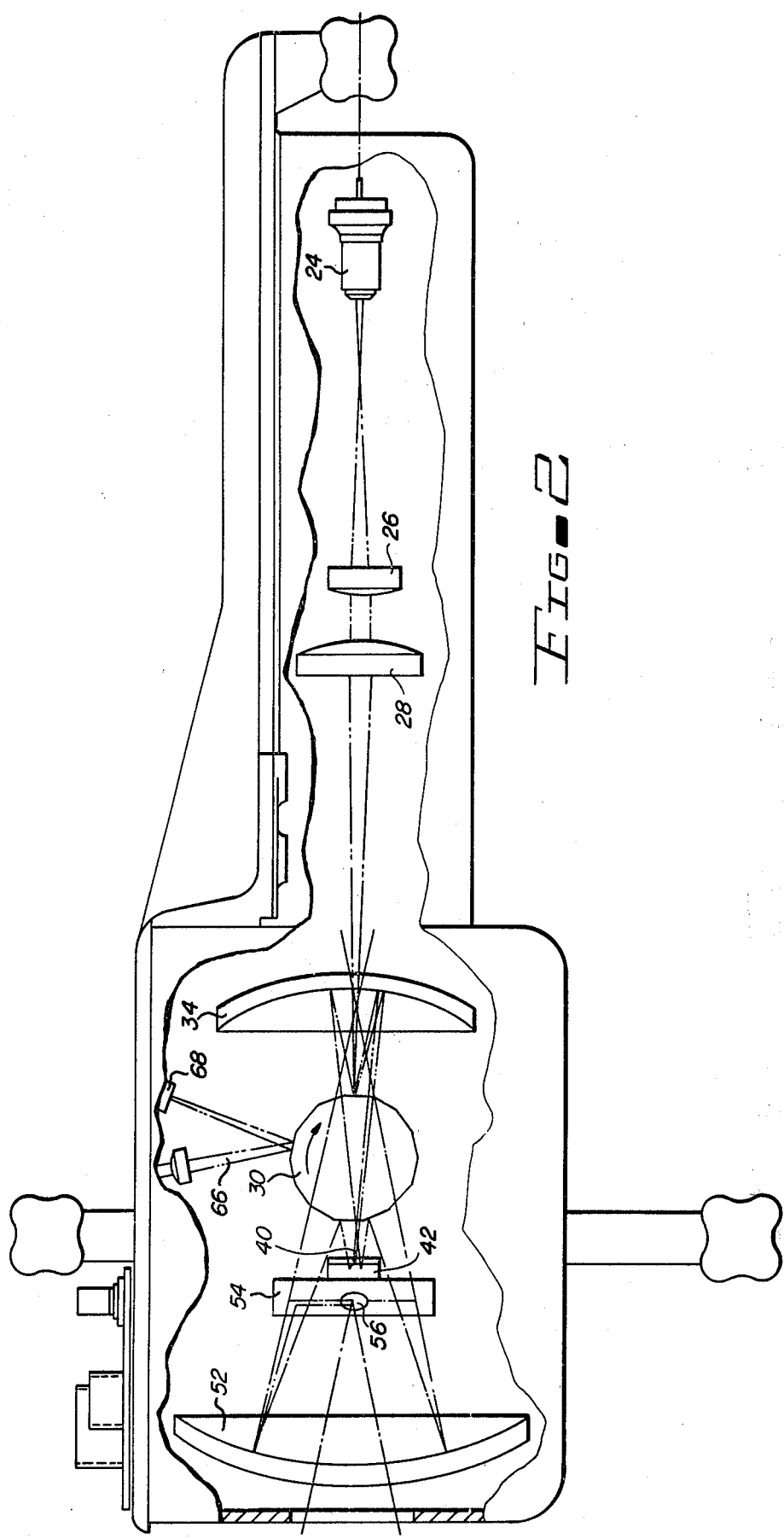
FIG. 2 is a plane view of the optical scanning apparatus illustrated in FIG. 1.

Referring now to FIGS. 1 and 2, a source of collimated light from a laser or equivalent device generates an input light beam indicated generally by reference number 10. Light beam 10 is properly aligned with the optical scanning apparatus of the present invention by directing it through a conventional bore sighting fixture 12. Input light beam 10 is directed vertically downward by mirror 14 to the input of an optical modulator 16 which modulates the intensity of the light beam to correspond to the intensity of a video signal of the type provided by a closed circuit television system or by a commercial television receiver. In the preferred embodiment of the present invention, modulator 16 is available from Intra-Action Corp. of Bellwood, Ill. and is designated as acoustic optic modulator Model No. AOM-70. Acoustic optic modulator 16 generates two significant angularly displaced optical output signals. In the preferred embodiment of the invention, a mask 17 is positioned as shown in FIG. 1 to block the zero order output signal from modulator 16. The operation of this acousto optic modulator will be discussed in greater detail below in connection with FIG. 7. Other different types of optical modulators, such as an electrooptic modulator, can also be used to modulate light beam 10.

The modulated optical output signal from modulator 16 is redirected into a horizontal plane by mirror 18. Mirrors 20 and 22 direct the modulated light beam to an input aperture of telescopic objective 24. Telescopic objective 24 and positive lens 26 function as a beam expander to expand the diameter of the modulated light beam. Positive lens 28 intercepts this expanded beam and converges it slightly. The converged, modulated light beam is directed onto a multi-faceted or polygon mirror 30. Polygon mirror 30 includes 24 facets each having a face length of 0.266 inches. The inscribed circle within the facets of mirror 30 has a diameter of 2.02 inches. The specific polygon mirror utilized in the preferred embodiment of the invention is available from Lincoln Laser Co. of Phoenix, Ariz. and is designated as Model No. PO-24-202-037.

Polygon mirror 30 is coupled to the output shaft of a high speed synchronous electric motor which is supported by motor housing 32. The entire motor/motor housing/polygon mirror assembly is inclined approximately 5° with respect to the vertical axis of the optical scanning apparatus as illustrated.

In order to recreate the desired 15,750 Hertz horizontal deflection rate, the polygon mirror is rotated at 1/24th of that rate which equals 656.25 revolutions per second or 39,375 revolutions per minute. The appropriate rotational rate and highly stable bearing support systems requird are provided by an electrical motor assembly manufactured by the Lincoln Laser Company of Phoenix, Ariz. and designated as Model No. 225 XLIM.

Figure 3:
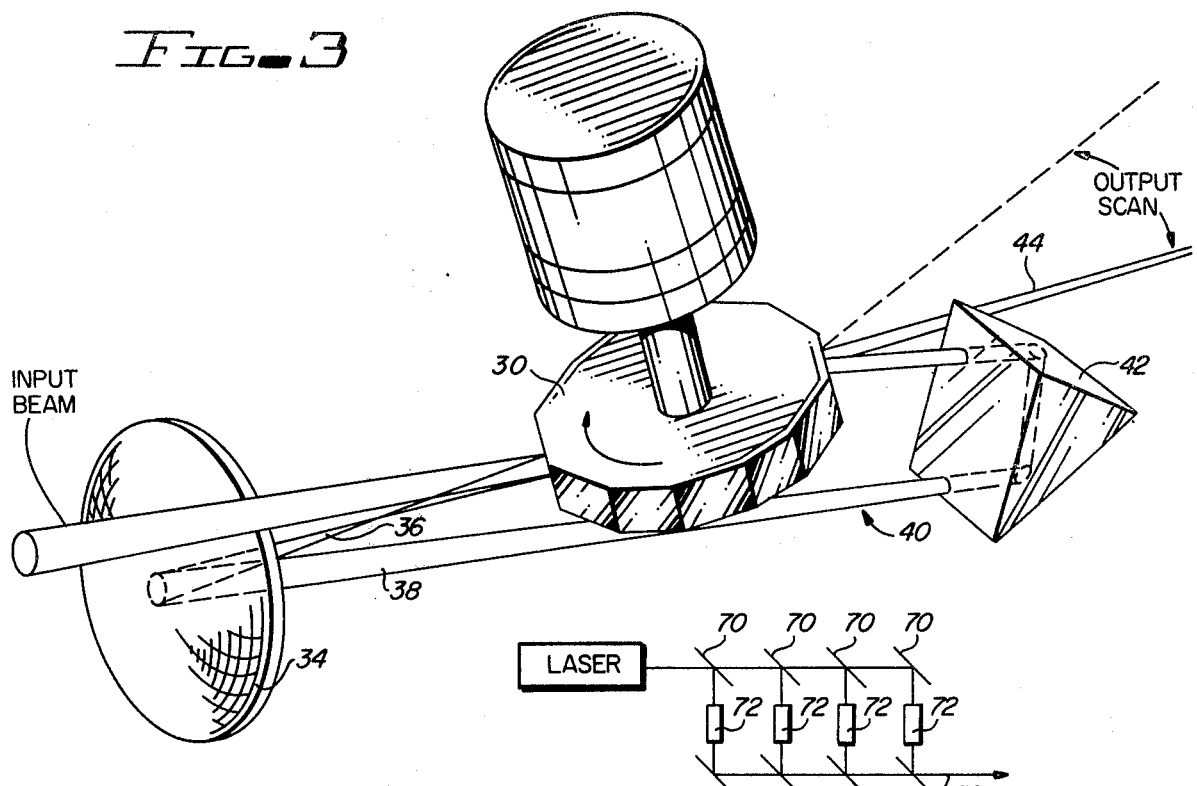
FIG. 3 is a perspective view of certain elements of the optical scanning apparatus of the present invention illustrating how a collimated input beam is reflected from a rotating polygon mirror onto a first reflecting surface through a prism onto a rear facet of the rotating mirror.
Figure 4A:
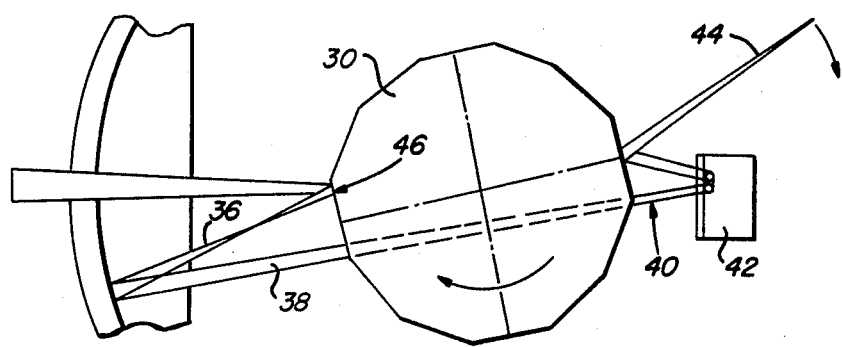
FIG. 4A depicts the rotating polygon mirror of the present invention at a point where the input beam is just beginning to travel along the leading edge of a mirror facet.
Figure 4B:
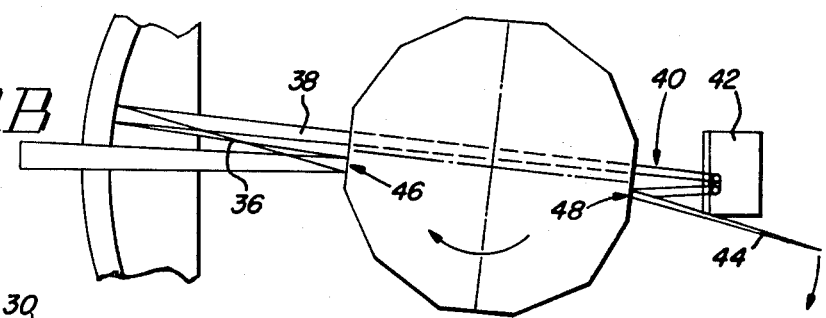
FIG. 4B depicts the input beam at approximately the midpoint of a mirror facet.
Figure 4C:
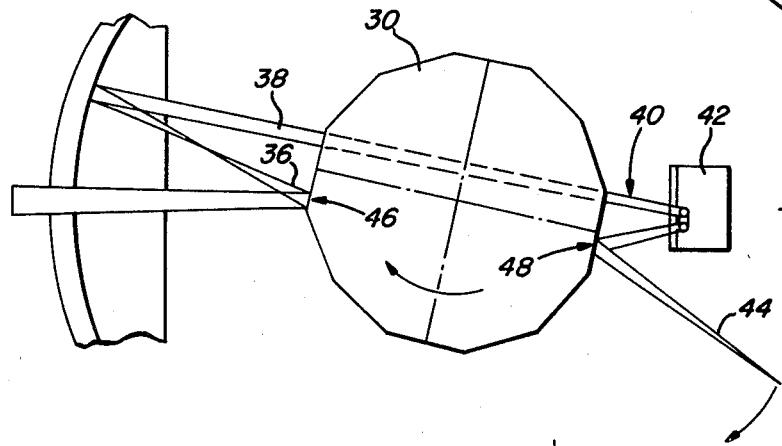
FIG. 4C depicts the input beam as it reaches the end of a mirror facet.
Figure 5A:
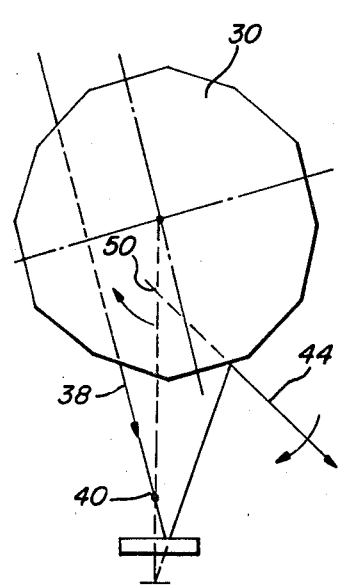
FIG. 5A corresponds to FIG. 4A and depicts the reflection of a single ray of light from a rear mirror facet.
Figure 5B:
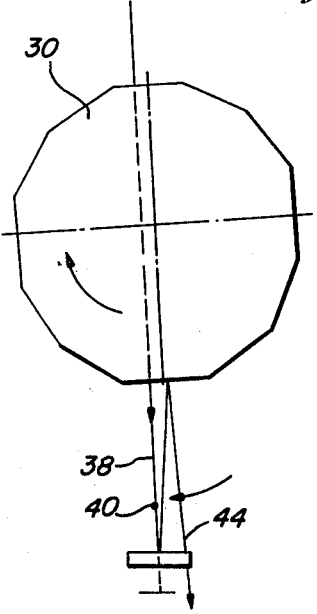
FIG. 5B corresponds approximately to FIG. 4B and depicts the reflection of a single ray of light from a rear facet of the mirror when the mirror is in a rotary position somewhat ahead of the rotary position depicted in FIG. 4B.

Referring now also to FIGS. 3, 4 and 5, the modulated light beam incident on the facets of mirror 30 is reflected outward and downward as a result of the angle of inclination of motor housing 32 onto a first reflecting surface in the form of a spherical mirror section 34. The central section of the complete spherical mirror of which spherical mirror section 34 forms an element would prevent the passage of the modulated light input beam from lens 28 to polygon mirror 30 necessitating the removal of approximately the upper 1/32 of an inch of the lower half of the spherical mirror. The vertical axis of spherical mirror 34 is oriented parallel to the vertical axis of the video display apparatus of the present invention. The modulated light input beam which is reflected from the facets of polygon mirror 30 and which scans the upper surface area of spherical mirror section 34 will be referred to as the first scanned reflected output beam and will be designated by reference number 36.

Spherical mirror 34 receives the first scanned reflected output beam 36 and generates a second scanned reflected output beam designated by reference number 38. Second scanned reflected output beam 38 passes through a first pivot vertex designated by reference number 40 which is defined by the radius of curvature of first reflecting surface 34.

Directing means in the form of a prism or a pair of inclined mirrors 42 is positioned to receive second scanned reflected output beam 38 after it has passed through first pivot vertex 40 and both elevates and redirects this light beam back onto the rotating mirror facets which are positioned on the rear surface of mirror 30. The reflection of second scanned reflected output beam 38 from a rear mirror facet produces an angularly amplified output beam 44 which is deflected within a single plane and corresponds to the horizontal raster scan. Angularly amplified output beam 44 is deflected at an angular rate substantially greater than the rate of deflection of either the first or second scanned reflected output beams.

Figure 5C:
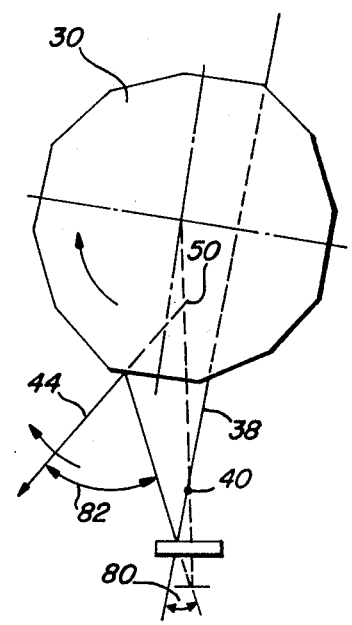
FIG. 5C corresponds to FIG. 4C and depicts the reflection of a single ray of light from a rear facet of the polygon mirror at a point where the input beam has reached the end of a front facet of the polygon mirror.

The phenomenon of angular amplification will now be described in greater detail by reference to FIGS. 4 and 5. Note first that the impact point designated by reference number 46 of the input light beam on the front mirror facet of mirror 30 moves along the length of the facet as the mirror rotates since the incident light beam remains fixed in space while the mirror rotates. In FIG. 4A, incident point 46 occurs at the leading edge of a front facet; in FIG. 4B, incident point 46 lies at the midpoint of the front facet; and in FIG. 4C incident point 46 lies at the end of the front facet. The position of the impact point designated by reference number 48 on the rear facet of mirror 30, on the other hand, maintains a relatively constant position somewhere in the vicinity of the midpoint of the rear facet. In other words, impact point 48 tracks the rotary motion of the rear facet and an angularly amplified output beam 44 is generated as a result of this unique relationship. In FIGS. 5A and 5C, reference number 50 designates the virtual pivot vertex of angularly amplified output beam 44.

Angularly amplified output beam 44 is reflected from the rear facet of mirror 30 and is directed to focusing means which takes the form of a second reflecting surface or spherical mirror section 52 which is oriented parallel to first reflecting surface 34. The reflected output beam from second reflecting surface 52 is directed vertically upward by mirror 54 to a ¼ inch diameter planar mirror 56 which is deflected back and forth as indicated by the arrows designated by reference number 58 by a galvanometer movement as will be described below. Mirror 56 is positioned at a second pivot vertex which is defined by the curvature of second reflecting surface 52. The location of mirror 56 at this pivot vertex permits the overall size of mirror 56 to be extremely small resulting in a low mass system which is readily reflected by a galvanometer movement. The deflection indicated by the arrows designated by reference number 58 provides the vertical or Y-axis deflection for the raster scan. The focal point of the light beam reflected from mirror 56 is controlled to be located at or close to the surface of the screen on which the raster image is to be projected.

Prior art optical scanniong systems that utilize rotating polygon mirrors have been unable to achieve both the high velocity rotational scanning rate and the ninety percent scan efficiency required to duplicate a television raster image due to mechanical limitations which limit the maximum rotational velocity of the polygon mirror. Polygon mirrors equal in size to the mirror utilized in the preferred embodiment of the present invention are available and can be rotated at the required 40,000 R.P.M. rate required to duplicate a television raster scan, but the prior art technique of reflecting a light beam from only a single facet of a small diameter rotating polygon mirror can achieve scanning efficiencies of only approximately seventy-five percent and is therefore unacceptable for television raster reproduction requirements. A seventy-five percent scan efficiency causes the television raster image to be compressed and distorted in the horizontal plane since the spots intended to reproduce the raster image overlap one another instead of having the required adjacent, non-overlapping relationship.

The arc designated by reference number 80 in FIG. 5C indicates the deflection angle of the second scanned reflected output signal which is generated after having been reflected from only a single facet of rotating mirror 30. Reference number 82 indicates the deflection angle of angularly amplified output beam 44 which has been reflected a second time from the rear facet of mirror 30. The substantially increased deflection angle of the angularly amplified output beam causes the angularly amplified output beam to trace a significantly longer horizontal path on a screen and yields the ninety percent scan efficiency required to project an uncompressed, non-distorted image on the screen. This undistorted image is formed from a plurality of spots positioned adjacent to one another in a non-overlapping relationship.

The unique method and structural configuration of the present invention generates an angularly amplified output beam which permits a small diameter polygon mirror capable of rotation at the required 40,000 R.P.M. rate to project a horizontal raster scan line having the required length. Thus a small diameter rotating polygon mirror is rendered equivalent to a significantly larger diameter polygon mirror having longer facets which is incapable of rotation at the required 40,000 R.P.M. rate due to mechanical limitations.

In the preferred embodiment of the present invention, the first reflecting surface 34 is commercially available from the Melles Girot Company of Irvine, Calif. and is designated as Model No. 01 MCG 023. First reflecting surface 34 is positioned approximately 1¾ inches from the closet facet of mirror 30. Second reflecting surface 52 is commercially available from the Melles Girot Company and is designated by Model No. 01 MCG 027. Second reflecting surface 52 is positioned approximately 3¾ inches from the nearest mirror facet of mirror 30. The total optical path length between second reflecting surface 52 and mirror 56 is approximately 7¼ inches. Mirror 56 is driven by a galvanometric optical scanner manufactured by General Scanning, Inc. of Watertown, Mass. and designated by Model No. G 100 PD. This device is driven by a servo controller designated by Model No. CCX-100 and is also available from General Scanning, Inc. FIGS. 1 and 2 are drawn to scale and other geometric dimensions not specifically recited above can be ascertained directly from these figures.

Figure 7:
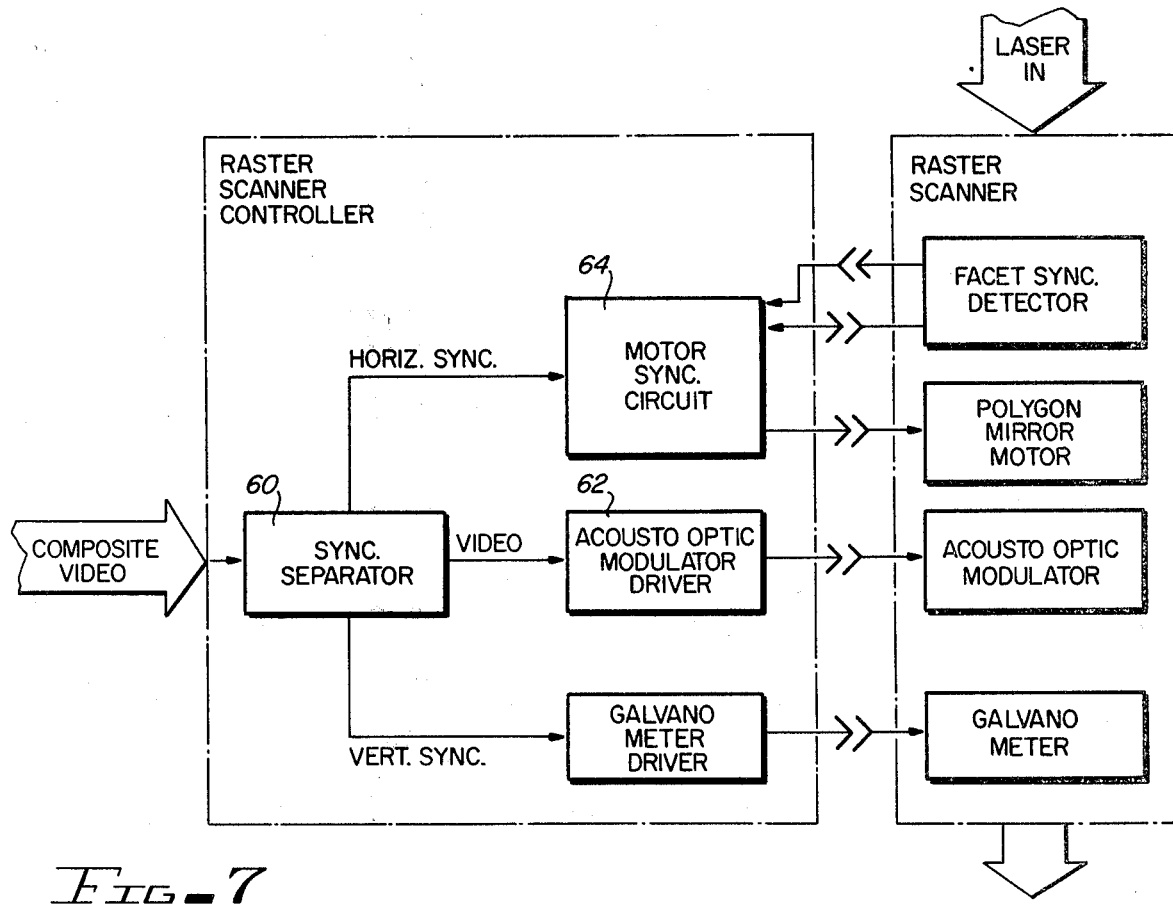
FIG. 7 is a block diagram representation of the electronic synchronization circuits of the present invention.

Referring now to FIG. 7, the manner in which vertical and horizontal synchronization is imparted to the moving mechanical elements of the present invention will now be described in some detail. A composite video signal including a video component and horizontal and vertical synchronization signals is coupled to a conventional sync separator designated in FIG. 7 by reference number 60. The video output portion of the signal from sync separator 60 is coupled to a commercially available acousto optic modulator 16. The vertical sync signal from sync separator 60 is coupled to the commercially available galvanometer driver which drives the galvanometer which provides deflection from mirror 56.

Sync separator 60 also provides a horizontal sync signal which is coupled to an input of motor sync circuit 64. FIG. 2 illustrates that an unmodulated portion of input light beam 10 is picked off from the input optics of the present invention and is directed against the rotating facets of mirror 30 as is indicated by reference number 66. An optical detector 68 is positioned behind a knife edge (not shown) to detect the passage of the light beam reflected from the facet edges of mirror 30. This facet synch detector output signal is coupled to another input of motor sync circuit 64 which generates a motor sync output signal to control the operating speed and phase angle of the motor driving polygon mirror 30.

Figure 6:
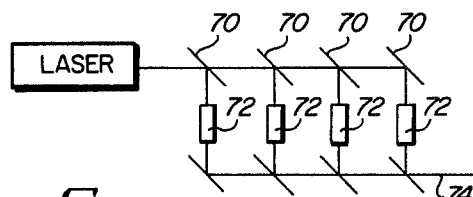
FIG. 6 illustrates a color version of the present invention.

It has been assumed up to this point that the source of collimated light or laser comprises a source of monochromatic light and that the output light beam will project a raster image on a screen comprising various intensities of the monochromatic output signal from the laser. In order to project a full color raster image on a screen, a laser, such as a krypton laser, having a plurality of different color monochromatic outputs can be utilized in the manner illustrated in FIG. 6. A plurality of dichroic filters indicated generally by reference number 70 are provided to filter out different single color output beams from the laser output beam. A separately modulated acousto optic modulator 72 then modulates each filtered monochromatic signal with the appropriate color intensity information. The modulated single color outputs from each acousto optic modulator 72 are then directed onto dichroic reflectors and recombined to produce a color output signal 74 which is then directed in the manner described above to the input of telescopic objective 24. The operation of the full color version of the preferred embodiment of the invention from this point on is identical to that described above.

Numerous different versions of the preferred embodiment of the present invention utilizing somewhat different components and different structural arrangements would be readily apparant to one of ordinary skill in the art and would not deviate from the scope of the present invention. For example, a comparatively wide mirror could be positioned at the point indicated by reference number 76 and deflected up and down by a galvanometer in order to provide the vertical deflection for the optical output beam from the optical scanning apparatus of the present invention. This galvanometer-deflected mirror would be wider than mirror 56 since it is not positioned at an optical vertex. In another embodiment of the present invention, a lens might be substituted for the spherical mirror sections 34 and 52 illustrated in FIGS. 1 and 2.

In addition, it has been found that performance of the present invention is maximized by directing the second scanned reflected output beam onto a rear facet of mirror 30. However, the optical scanning apparatus of the present invention can be rendered fully operational by directing the second scanned reflecting output beam back onto the same mirror facet which produced the first scanned reflected output beam or to any other mirror facet positioned around the circumference of mirror 30. If the second scanned reflected output beam is directed back onto the same mirror facet that produced the first scanned reflected output beam, the optical path traversed by the second scanned reflected output beam must be extended by reflection from a plurality of plane mirrors or their optical equivalent to cause the first pivot vertex to be formed before that beam is reflected by the same mirror facet. The degree of angular amplification obtained is affected by the particular mirror facet relationship chosen and it has been found that the greatest angular amplification can be obtained when the second scanned reflected output beam is directed onto the rear facet opposite the front facet of mirror 30.

Although the optical scanner of the present invention has been disclosed as being capable of projecting a television raster scan image on a screen, it may also be adapted to scan the surface of an object, such as a silicon chip, printed circuit board, or various other surfaces, for quality control inspection. In this application, an unmodulated light beam is deflected across the surface of the item to be inspected and an optical detector is positioned to receive the light beam reflected from that surface.

The light beam generated by the optical scanner of the present invention is deflected in the horizontal plane as disclosed above. Vertical deflection can be accomplished either by a galvanometer movement in the manner described above, or in the alternative, by mounting the object to be inspected on a vertical stage which is either incrementally or continuously displaced with respect to the horizontally deflected output beam from the optical scanner. Numerous other uses for the optical scanner of the present invention will be readily apparent to one of ordinary skill in the art.

Accordingly, it is intended by the appended claims to cover all such modifications of the invention which fall within the true spirit and scope of the invention.

I claim:

1. An optical scanner for generating a raster scan on a remotely positioned screen comprising:
   a. a rotating mirror having a plurality of facets disposed around the mirror axis of rotation;
   b. first directing means for receiving a coherent light input beam and for directing the light beam through a first optical axis onto the rotating mirror facets at a first position to produce a first scanned reflected output beam;
   c. a first spherical mirror laterally centered about and positioned below the first optical axis for receiving the first scanned reflected output beam and for generating a second scanned reflected output beam which passes through a first pivot vertex;
   d. second directing means for receiving the second scanned reflected output beam and for directing said beam back onto the rotating mirror facets at a second position spaced apart from the first position to generate an angularly amplified output beam passing through a first plane and having a sweep path symmetrically oriented with respect to a second optical axis;
   e. focusing means for receiving and redirecting the angularly amplified output beam through a second pivot vertex; and
   f. a single surface mirror repetitively deflected through an arc of less than ninety degrees and positioned in proximity to the second pivot vertex for receiving the angularly amplified output beam, for deflecting said beam through a second plane oriented perpendicular to the first plane, and for directing said beam onto the screen to form an optical scanner output beam.

2. The optical scanner of claim 1 further including synchronizing means coupled to the rotating mirror and to the single surface mirror for controlling the rate and phase of rotation of said rotating mirror and the rate and phase of deflection of said single surface mirror to cause the output beam from said optical scanner output beam to scan a two-dimensional raster pattern.

3. The optical scanner of claim 2 wherein said focusing means comprises a second spherical mirror.

4. The optical scanner of claim 3 wherein said single surface mirror includes a galvanometer.

5. The optical scanner of claim 3 wherein said second directing means directs the second scanned reflected output beam back onto the rotating mirror facets at a second position diametrically opposed to the first position.

6. The optical scanner of claim 3 wherein the first scanned reflected output beam passes below said rotating mirror and wherein said second directing means includes reflecting means for elevating and reflecting the first scanned reflected output beam with respect to said rotating mirror.

7. The optical scanner of claim 6 wherein said second directing means comprises a prism.

8. The optical scanner of claim 6 wherein said second directing means includes a corner reflector mirror.

9. The optical scanner of claim 1 further including means positioned in the path of the coherent light input beam for modulating the intensity of said light beam.

10. The optical scanner of claim 9 wherein said modulating means modulates the intensity of the light beam to correspond to the intensity of a video signal.

11. The optical scanner of claim 1 further including means positioned in the path of the coherent light input beam for converging said beam.

12. An optical scanner for generating a raster scan on a remotely positioned screen comprising:
   a. a rotating mirror having a plurality of facets disposed around the mirror axis of rotation;
   b. means for receiving a coherent light beam and for directing the light beam through a first optical axis onto the rotating mirror facets at a first position to produce a first scanned reflected output beam;
   c. a first spherical mirror laterally centered about and positioned below the first optical axis for receiving the first scanned reflected output beam and for generating a second scanned reflected output beam which passes through a first pivot vertex;

d. non-refractive means for receiving the second scanned reflected output beam and for directing the second scanned reflected output beam back onto the rotating mirror facets at a second position spaced apart from the first position to generate an angularly amplified output beam passing through a first plane and having a sweep path symmetrically oriented with respect to a second optical axis;

e. a second spherical mirror for receiving and redirecting the angularly amplified output beam through a second pivot vertex;

f. a planar mirror, including means for repetitively deflecting said mirror through an arc of less than ninety degrees, positioned in proximity to the second pivot vertex for receiving the angularly amplified output beam, deflecting said beam through a second plane oriented perpendicular to the first plane, and directing said beam onto the screen; and g. synchronizing means coupled to the rotating mirror and to the deflecting means for synchronizing the rotating mirror and the deflecting means to project a raster image on the screen.

13. The optical scanner of claim 12 wherein said synchronizing means further includes rotating mirror position sensing means comprising:

a. means for reflecting a beam of light from the rotating mirror facets as said facets pass a predetermined fixed position;

b. sensor means for receiving the reflected beam of light and for converting the beam of light into an electrical output signal; and c. means coupled to receive the electrical output signal and for processing said output signal to generate a timing signal representative of the position of said rotating mirror.

* * * * *